(12) United States Patent
Bowie (10) Patent No.: US 9,404,613 B2
(45) Date of Patent: Aug. 2, 2016

(54) PIPELINE ISOLATION FOR SMALL BORE PIPE

(71) Applicant: STATS (UK) Limited, Aberdeen (GB)

(72) Inventor: Angus George Bowie, Aberdeen (GB)

(73) Assignee: STATS (UK) Limited, Aberdeenshire (GB)

( * ) Notice: Subject to any disclaimer, the term of this patent is extended or adjusted under 35 U.S.C. 154(b) by 0 days.

(21) Appl. No.: 13/756,753

(22) Filed: Feb. 1, 2013

(65) Prior Publication Data

US 2013/0192687 A1 Aug. 1, 2013

(30) Foreign Application Priority Data

Feb. 1, 2012 (GB) .................................... 1201770.3

(51) Int. Cl.
*F16L 55/16* (2006.01)
*F16L 41/06* (2006.01)
*F16L 55/124* (2006.01)

(52) U.S. Cl.
CPC ................. *F16L 55/16* (2013.01); *F16L 41/06* (2013.01); *F16L 55/124* (2013.01); *Y10T 137/0402* (2015.04)

(58) Field of Classification Search
CPC ........ F16L 55/16; F16L 55/132; F16L 55/124
USPC ....................... 137/317, 318, 315.41, 315.42, 137/15.12–15.15
See application file for complete search history.

(56) References Cited

U.S. PATENT DOCUMENTS

| | | | | |
|---|---|---|---|---|
| 1,743,338 A | * | 1/1930 | Field .......................... | 137/315.41 |
| 2,171,942 A | * | 9/1939 | Mueller ........................ | 137/318 |
| 2,763,282 A | * | 9/1956 | Reedy et al. ................... | 137/318 |
| 5,316,037 A | * | 5/1994 | Martin .......................... | 137/318 |
| 5,345,664 A | | 9/1994 | McMahon et al. | |
| 5,345,964 A | * | 9/1994 | Friedel .......................... | 137/318 |
| 5,483,990 A | * | 1/1996 | Martin .................... | F16L 41/06 137/318 |
| 5,620,020 A | * | 4/1997 | Collins ................... | F16L 41/06 137/318 |
| 5,676,171 A | | 10/1997 | Heed | |
| 6,892,752 B2 | * | 5/2005 | Burlock et al. ............... | 137/317 |
| 7,281,543 B2 | * | 10/2007 | Calkins et al. ................ | 137/317 |

(Continued)

FOREIGN PATENT DOCUMENTS

| | | |
|---|---|---|
| CN | 200982455 | 11/2007 |
| DE | 1903767 | 8/1970 |

(Continued)

OTHER PUBLICATIONS

European Search Report for EP Application No. 13153739.1 dated Feb. 11, 2014.

(Continued)

*Primary Examiner* — Kevin Lee
(74) *Attorney, Agent, or Firm* — Carlson, Gaskey & Olds, P.C.

(57) ABSTRACT

An isolation tool for isolating small bore pipe has a spigot having a proximal section with diameter and a distal section with smaller diameter. A seal is provided on the tool around the smaller diameter section. In some embodiments, the isolation tool is located through a hole in the wall of the pipe and through a second hole in the opposite wall of the pipe, the tool arranged so that when the tool is located through the second hole the seal fills the bore of the pipe and isolates a section of the pipe. In other embodiments, the tool may be located between severed pipe sections.

18 Claims, 5 Drawing Sheets

(56) References Cited

U.S. PATENT DOCUMENTS

| | | | |
|---|---|---|---|
| 8,104,517 B2 * | 1/2012 | German et al. | 138/89 |
| 2010/0307604 A1 | 12/2010 | German et al. | |

FOREIGN PATENT DOCUMENTS

| | | |
|---|---|---|
| DE | 3308876 | 9/1984 |
| DE | 3719395 A1 | 12/1988 |
| EP | 0945661 A2 | 9/1999 |
| EP | 0952381 A2 | 10/1999 |
| EP | 1624233 A1 | 2/2006 |
| GB | 883462 | 11/1961 |
| GB | 2294306 A | 4/1996 |
| GB | 2344396 | 6/2000 |
| GB | 2352281 | 1/2001 |
| JP | 2001050461 A | 2/2001 |
| JP | 2003-120883 | 4/2003 |
| WO | 2010/104947 | 9/2010 |

OTHER PUBLICATIONS

United Kingdom Search Report for Application No. GB1201770.3 dated May 28, 2012.

* cited by examiner

PIPELINE ISOLATION FOR SMALL BORE PIPE

REFERENCE TO RELATED APPLICATIONS

The application claims priority to United Kingdom Application No. 1201770.3 which was filed on Feb. 1, 2012.

FIELD OF THE INVENTION

This invention relates to pipe isolation and more particularly, but not exclusively, to isolation of small bore pipe or other pipe where access to the interior of the pipe is limited or restricted.

BACKGROUND TO THE INVENTION

Small bore pipe, for example having an inner diameter of about 3 inches (about 76 mm) or less, is used extensively as process pipework in a variety of industries, including the oil and gas, pharmaceutical, manufacturing and utility industries.

At various points during the installation, working life or decommissioning of any pipe, it may be necessary to isolate a section of the pipe for repair, replacement or to perform an operation in the pipe.

Typically, pipe isolation in large bore pipe may be carried out by inserting a tool into the pipe bore to either block the pipe bore or surround a region of the pipe wall.

However, isolating small bore pipe offers several isolation challenges compared to larger bore pipe.

Firstly, mechanical tooling presently available for large bore pipe does not easily scale down for use in small bore pipe. Furthermore, as noted above small bore pipe is often used in process pipework where access for the installation of isolation devices is restricted or limited.

A number of systems for isolating small bore pipe, such as gel products and freeze plugs, have been proposed. However, these proposed solutions are only suitable for relatively low pressure or ambient isolations. Although some mechanical systems have been developed for straight and open access pipework, including some hot tap installed isolation tools with welded fittings, existing mechanical systems require access for welding equipment and also that the pipe be severed inside the fitting, which may not be desirable or practical in many applications.

SUMMARY OF THE INVENTION

According to a first aspect of the present invention, there is provided a method for isolating a small bore pipe, the method including locating an isolation tool between two sections of a pipe such that the isolation tool spans the bore of the pipe and the pipe walls, the isolation tool having a seal element mounted thereon which is arranged to seal the pipe bore.

According to a further aspect of the present invention, there is provided a tool for isolating small bore pipe, the tool including a body, and a seal element for mounting on the body. The tool is configured so that when the body spans the bore of the pipe and the pipe walls, the seal element seals the pipe bore.

The tool may be located between the sections of pipe by any suitable means. In some embodiments, the tool may be configured to extend through holes provided in the walls of the pipe. For example, the tool may be adapted for location through a first hole provided in a first wall section of the pipe and a second hole provided in another, opposing, wall section.

In preferred embodiments, the first and second holes may be diametrically opposed. In other embodiments, the pipe may be severed and the tool provided between the severed ends of the pipe. In each of the above embodiments, the tool may be positioned so that the tool spans the pipe bore and the pipe walls so that the tool provides at least two contact surfaces with the pipe for resisting and/or transferring fluid pressure forces exerted on the tool from fluid in the pipe.

In use, methods and apparatus of embodiments of the present invention facilitate isolation to be achieved in small bore pipework that lacks incumbent isolation and/or where there is no access into the system from an end of the pipe to install traditional isolation devices.

Moreover, the seals in this isolation tool are bi-directional so facilitating pressure testing of the reinstated pipework.

In embodiments where the tool is located through holes in the pipe, the method may include the preliminary step of forming said holes in the pipe.

The first and second holes may be formed by any suitable tool or method.

In particular embodiments, the first and second holes may be formed by a hole cutting tool, in particular but not exclusively a hot tap cutting tool. The hole cutting tool may be adapted to drill both the first and the second holes in the pipe in a single operation. Alternatively, the first and second holes may be created in separate operations. While hot tap cutting tools are known in the art, standard hot tap cut holes are generated with hole saws and pilot drills, the pilot drill creating an initial bore which is then extended by the hole saw. Hot tap cutting tools are designed so that pilot drill does not reach the far side of the pipe before the hole has been fully formed and the coupon released. In embodiments of the present invention, however, the hot tap cutting tool may be configured with a longer pilot drill in order that the pilot drill penetrates the far side of the pipe, thereby providing a penetration and support for the isolation tool.

The hole cutting tool may be configured so that the first hole has a diameter corresponding to the pipe bore.

In alternative embodiments where the tool is located between severed pipe sections, the method may include the preliminary step of severing the pipe, thereby creating the pipe sections.

The pipe may be severed by any suitable tool or method. In particular embodiments, the pipe may be severed by a cutting tool, in particular but not exclusively a hot tap cutting tool. The cutting tool may be configured so that the diameter of the cutting bit is larger than the pipe outer diameter, so that the tool severs the pipe.

The method may include the preliminary step of providing a clamp surrounding the pipe. The clamp may be of any suitable form or construction. In use, the clamp may be configured to engage the outer surface of the pipe.

The clamp may include one or more lock for engaging the outer surface of the pipe. The lock may be of any suitable form and construction. In particular embodiments, the lock may include a taper lock. The lock may be activated by any suitable activation arrangement. The activation arrangement may include a mechanical activation arrangement, hydraulic activation arrangement, pneumatic activation arrangement or the like.

The clamp may further include seals for sealing against the outer surface of the pipe. In use, the clamp, seals and pipe or pipe sections may define an annular volume or chamber.

The clamp may include a recess for engaging a distal end of the isolation tool. In embodiments where holes are provided in the pipe, the distal end of the isolation tool may engage the recess to provide additional structural support for retaining the isolation created by the seal element. In embodiments where the pipe is severed, engagement between the distal end of the isolation tool and the recess provides the structural support to retaining the isolation created by the seal element.

The clamp may also be of the form of a split sleeve welded fitting with a similar port configuration for the hot tap and isolation tool access.

A branch connection, for example but not exclusively a hot tap, may be provided on the clamp to provide access to the pipe. This branch penetration is usually created with a hot tap process, using either a mechanical or welded branch fitting.

The tool may be of any suitable form and construction. In particular embodiments, the isolation tool includes a spigot having a first diameter section and a second, smaller diameter section.

The seal element may be of any suitable form and construction. In particular embodiments, the seal element may include a compliant seal. The provision of a compliant seal permits the seal to deform and fill the bore of the pipe.

The seal element may be mounted on the second, smaller diameter, section of the spigot.

In use, in embodiments where the tool is adapted for location through holes in the pipe, as the spigot is driven through the branch penetration and into the pipe, the distal end of the tool may pass through the second hole on the far side of the pipe. The compliant seal element may react against the base of the pipe and be compressed by further axial movement of the spigot. This compression will cause the seal to contact the pipe bore and the edge of the pipe at the hot tap penetration so generating a block and applying an isolation at the hot tap penetration.

Alternatively, in embodiments where the tool is adapted for location between severed pipe sections, the tool may be configured so that as the distal end of the spigot is driven into the clamp recess, the seal element may seal against the open ends of each pipe section. The ends of the pipe section may be formed to facilitate sealing engagement between the seal element and the pipe ends.

The tool may be adapted to be driven into the pipe or to the desired location between the pipe sections by any suitable means. In particular embodiments, the tool may be driven by a linear actuator. The linear actuator may be of any suitable form, in particular but not exclusively a hydraulic cylinder. However, it will be recognized that the tool may alternatively be driven by a pneumatic cylinder, electric actuator, or by mechanical means such a bolt or threaded connection.

Embodiments of the present invention may provide a temporary isolation of the pipe. For example, the tool may be withdrawn to remove the isolation, leaving full bore operation. Alternatively, embodiments may provide a permanent isolation.

In other aspects of the present invention, a plurality of penetrations or cuts may be formed in the pipe and a plurality of the tools used to provide dual isolation.

It should be understood that the features defined above in accordance with any aspect of the present invention or below in accordance with any specific embodiment may be utilized, either alone or in combination with any other defined feature, in any other aspect of the invention.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
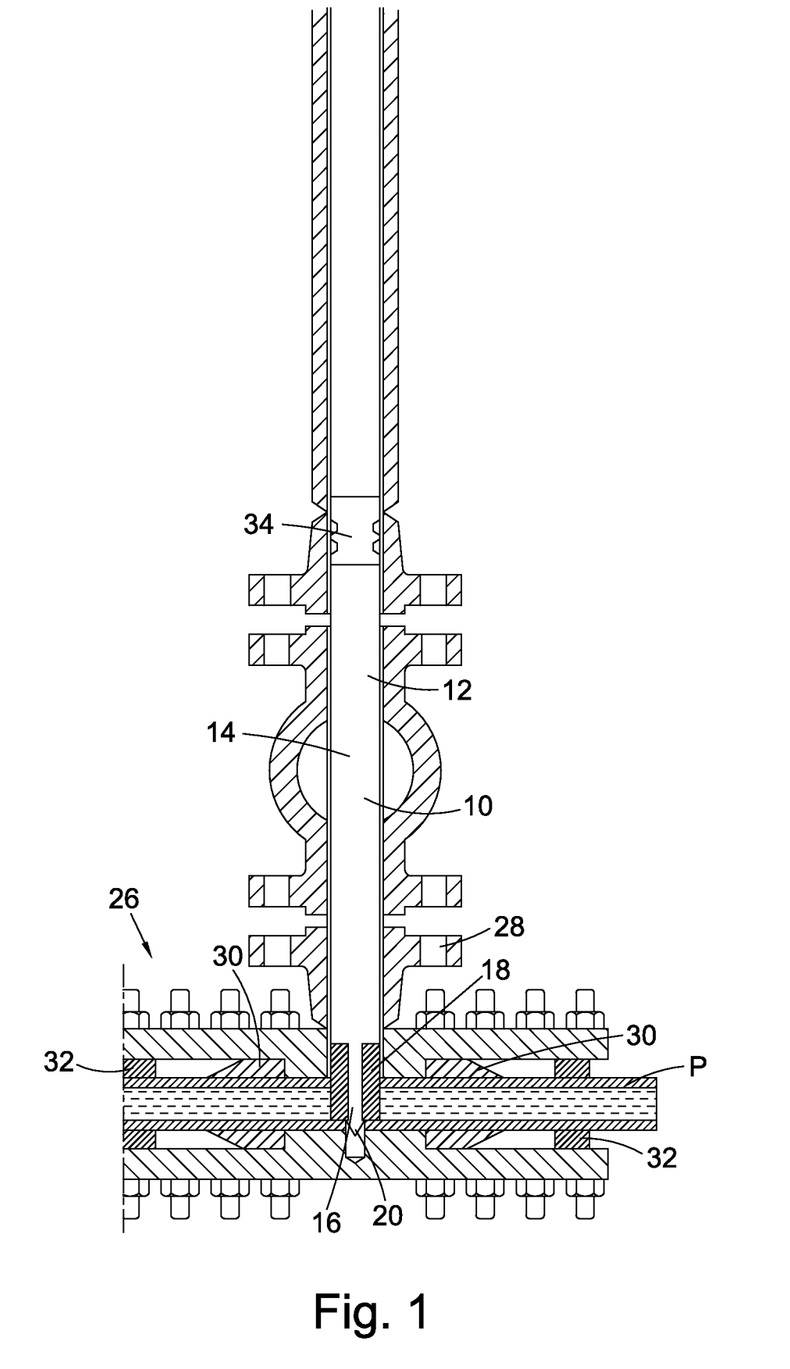
FIG. 1 shows an isolation tool for small bore pipe according to an embodiment of the present invention, shown during deployment into a section of a pipe.
Figure 2:
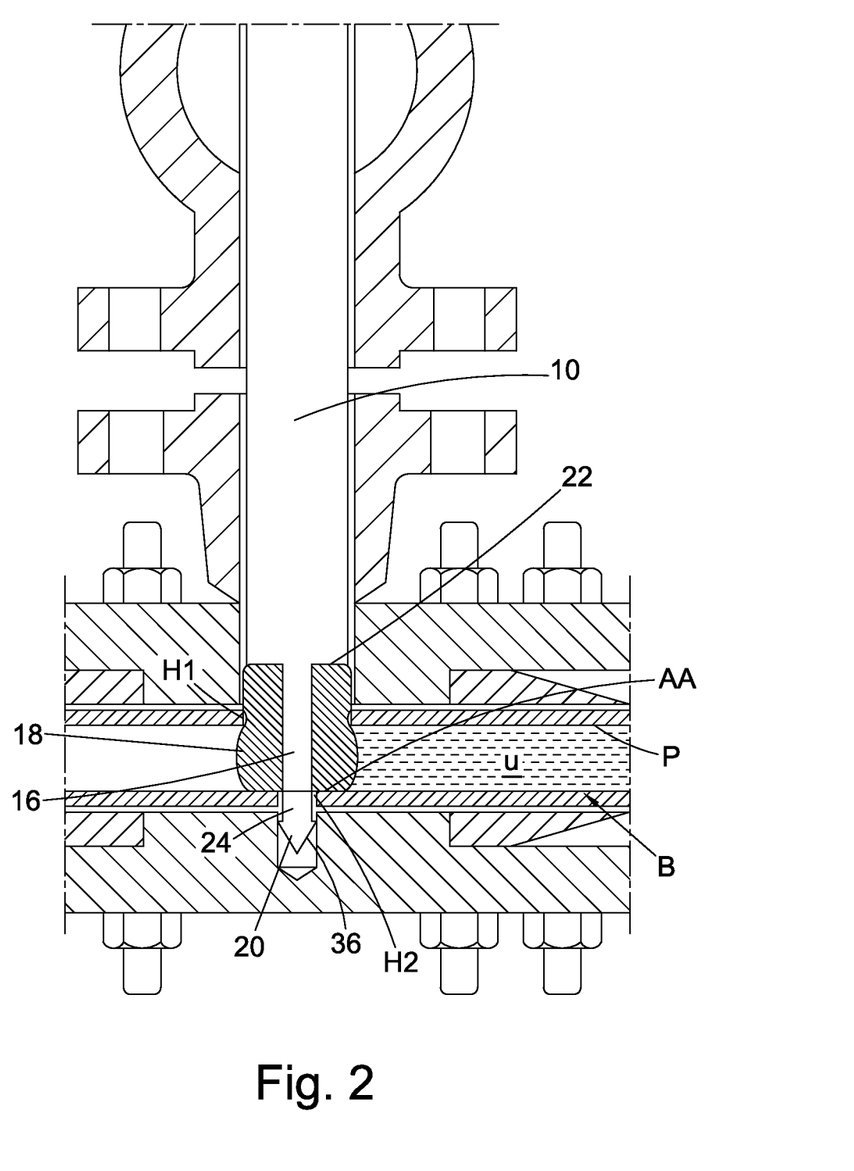
FIG. 2 shows an enlarged view of the isolation tool shown in FIG. 1, in use.

Referring first to FIGS. 1 and 2, there is shown an isolation tool 10 according to an embodiment of the present invention. It is intended that the tool 10 will be sold under the name BISTOP.

FIG. 1 shows the isolation tool 10 during deployment into a section of a pipe P. FIG. 2 shows an enlarged view of the isolation tool 10 in use and providing an isolation in the pipe P.

As shown in FIGS. 1 and 2, the isolation tool 10 has a spigot 12 having a proximal section 14 with diameter D1 and a distal section 16 with smaller diameter D2. A seal 18 is provided on the tool 10 around the smaller diameter section 16. The smaller diameter section 16 forms a leading end of the spigot 12, the distalmost end of the smaller diameter section 16 formed or otherwise provided with a tapered nose 20.

In use, the isolation tool 10, in particular the smaller diameter section 16, is adapted for location through a hole H1 in the wall of the pipe P and through a second hole H2 in the opposite wall of the pipe P. The tool 10 is configured so that when the tool 10 extends through the second hole H2, the seal 18 fills bore B of the pipe P, isolating a section of the pipe P, for example to facilitate repair, replacement or to permit an operation to be carried out.

Whereas conventional techniques for penetrating pipework seek to avoid penetrating the opposing side of the pipe P, embodiments of the present invention intentionally involve spanning the pipe P. As the tool 10 spans the pipe P, any fluid pressure forces exerted on the tool 10 in use are supported by the pipe P and by the spigot 12. Embodiments of the present invention are thus capable of resisting high fluid pressure forces and provide a high pressure isolation in the pipe P.

The seal 18 includes an annular or cylindrical compliant seal element which rests between distal end surface 22 of larger diameter spigot section 14 and the proximal rear surface or lip 24 of the nose 20. The provision of the compliant seal 18 permits the seal to deform and fill the bore B of the pipe P as the seal is squeezed between distal end surface 22 and the annular area AA surrounding the hole H2.

As can be seen from FIGS. 1 and 2, in order to access the pipe P, the isolation tool 10 is provided in combination with a clamp 26 forming a branch connection 28. The clamp 26 includes one or more taper locks 30 for gripping the pipe P and seals 32 for sealing around the outer surface of the pipe P.

The isolation tool 10 is adapted for location into and out of the pipe P through hot tap connection 28 using a launcher 34 coupled to the spigot 12.

The method and operation of an embodiment of the present invention will now be described in more detail with reference to FIGS. 1 and 2.

The first step is to install the clamp 26, in this case a fully structural hot tap clamp, onto the section of the pipe P. The clamp 26 is designed to accommodate the hot tap of both sides of the pipe.

In order to create the penetration in the pipe P, a hot tap drilling machine is used to cut the full bore hole H1 in the near side of the pipe P and the pilot hole H2 on the opposing, far side of the pipe P. The hot tap drilling machine utilizes a hole saw with a center drill as a pilot. The hole saw is mounted in a pressure competent housing so that the hole can be drilled without breaching containment. A valve is mounted between the clamp 26 and the hot tap machine to allow the hot tap machine to be removed. Hot drilling machines and techniques are known to those in the art. However, in the present invention the length of the pilot is configured to penetrate through the opposing pipe wall, contrary to standard hot tap operation. Once the holes H1 and H2 have been cut and the coupons released, the hot tap machine is retracted and the valve closed. The hot tap machine can then be removed.

The next step is to deploy the isolation tool 10 into the pipe P to form the isolation. The isolation tool 10 is initially housed in the launcher 34 which is pressure competent and which is connected to the valve.

In use, the isolation tool 10 is run through the valve and the hot tap and into the pipe P, the smaller diameter spigot section 18 extending into the pipe P through the hole H1 and out through the hole H2 in the opposing side of the pipe P. As can be seen most clearly in FIG. 2, the nose 20 of the spigot 12 engages a recess 36 in the body of the clamp 26, this providing additional structural support for the tool 10 in use. The tool 10 is configured so that when the tool 10 extends through the second hole H2, the seal 18 fills bore B of the pipe P, isolating the upstream section U of the pipe P.

As the tool 10 spans the pipe P, any fluid pressure forces exerted on the tool 10 in use are supported by the pipe P, as well as the recess 36 (if engaged), and the larger diameter section 16 of the spigot 12. Embodiments of the present invention are thus capable of resisting high fluid pressure forces and provide a high pressure isolation in the pipe P.

After the required isolation has been achieved, the pipe P on the isolated side of the tool 10 can be severed, for example by a cold work cutting tool. The clamp 26 may then be removed and new connections and pipework added before withdrawing the tool 10 from the pipe P through the hot tap and valve.

It should be understood that the embodiment described herein is merely exemplary and that various modifications may be made thereto without departing from the scope of the invention.

Figure 3:
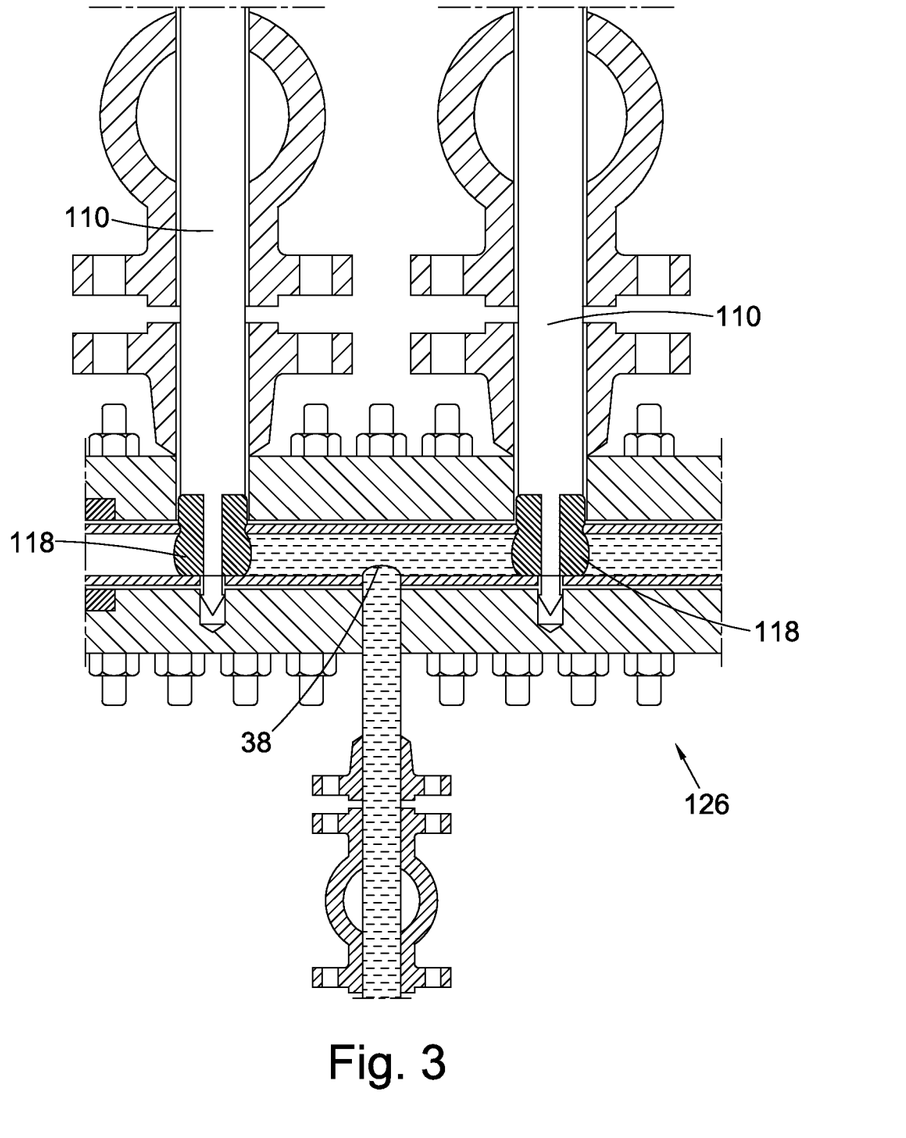
FIG. 3 shows two isolation tools according to an embodiment of the present invention with a bleed between them so as to provide double block and bleed isolation.

For example, FIG. 3 shows an isolation assembly 100 including two isolation tools 110. In the embodiment shown, each of the isolation tools 110 are similar to the isolation tool 10 described above and like components of the tool 110 to those of the tool 10 are represented by like reference signs incremented by 100.

As shown, an additional hot tap penetration 38 is provided between the isolations provided by the tools 110, the additional penetration 38 providing access to manipulate fluid pressure in the void between the seals 118. This arrangement provides double block and bleed isolation. In use, once the two isolation tools 110 have been deployed, the downstream tool 110 can be pressure tested to full isolation pressure by venting the isolated section and applying test pressure to the void between the seals 118. Venting the void between the seals 118 after the downstream test provides a test of the upstream seal 118. This, together with the ability to bleed the void between the seals 118 to a safe location, passes the double block and bleed requirements required in the oil and gas industry.

Figure 4:
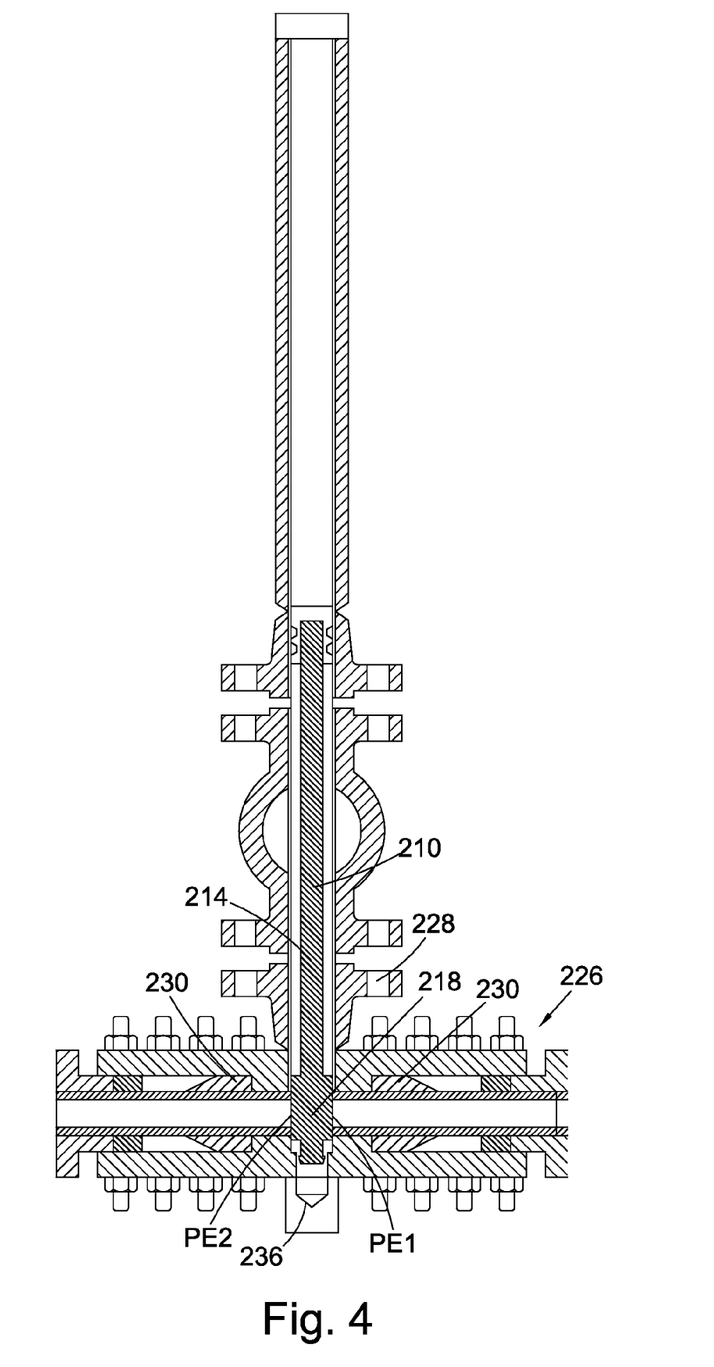
FIG. 4 shows an isolation tool according to a further embodiment of the present invention.
Figure 5:
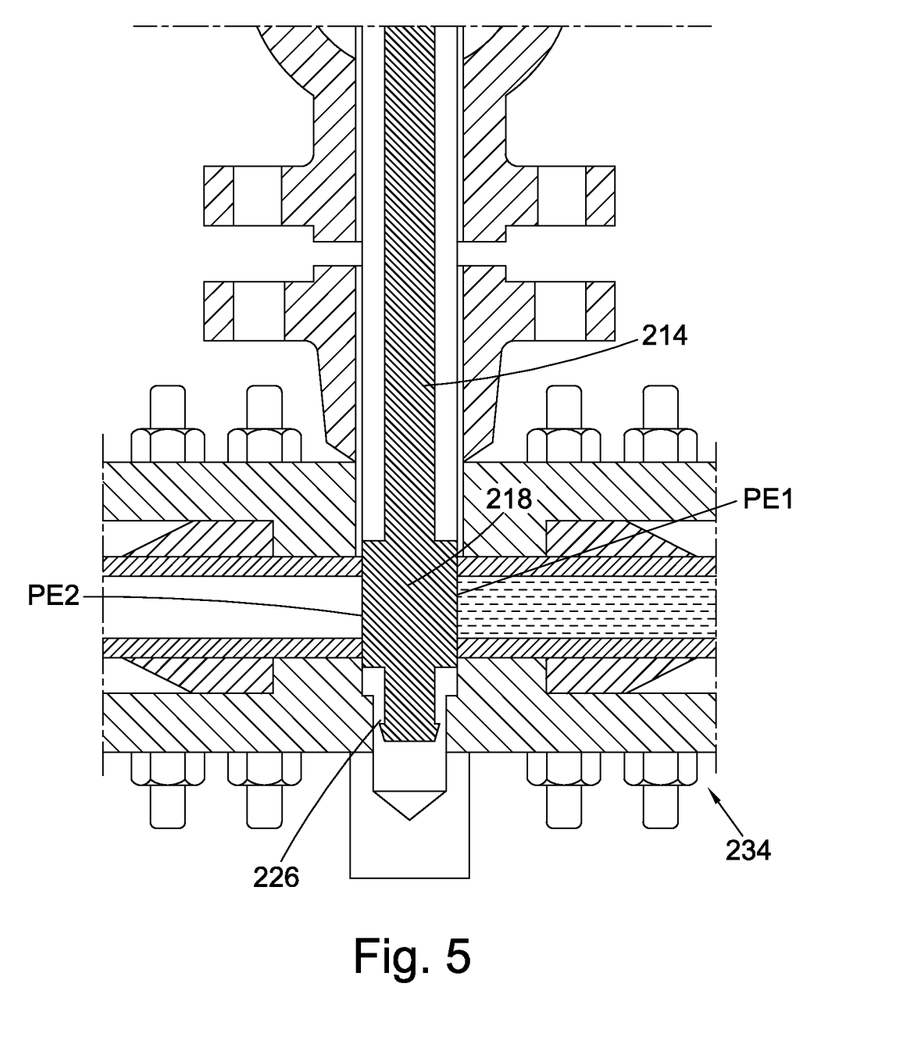
FIG. 5 shows an enlarged view of the isolation tool shown in FIG. 4, in use.

Referring to FIGS. 4 and 5, there is shown an alternative embodiment of the present invention. In this alternative embodiment, rather than forming holes in the pipe P, the pipe P is severed using a hot tap cutter of larger diameter than the pipe outer diameter. The pipe ends PE1 and PE2 are scalloped to mate with the cylindrical seal 218, as will be described further below. In this embodiment, the pipe axial integrity is maintained by the taper locks 230 of the clamp 226.

In order to provide isolation of the pipe ends PE1 and PE2, the severed ends of the pipe sections are sealed using an isolation tool 210. The isolation tool 210 is similar to the isolation tool 10 and like components are represented by like numerals incremented by 200.

In contrast to the isolation tool 10, in the isolation tool 210 the seal 218 is mounted on a thin spigot with a solid ring at the end which can slide up the small spigot. The thin spigot runs through a tube as an alternative method of construction. The solid ring reacts against the base of the clamp and provided a compression shoulder to ensure even compression of the seal 218.

In use, the isolation tool 210 is run through the valve and hot tap 228 and into the clamp 226, the smaller diameter spigot section 214 of tool 210 engaging a recess 236 in the clamp 226. The isolation tool 210 is configured so that as the spigot 214 is driven into the clamp 226, the seal 218 will seal against the pipe open ends PE1 and PE2 left by the hot tap cutter.

Once sealed by the compression seal 218, each pipe end PE1, PE2 can be pressure tested to verify both seals and so provide a double block and bleed level of isolation.

FIG. 5 shows the alternative embodiment of FIG. 4 in its set configuration. As shown in FIG. 5, the compression seal 218 seals against both scalloped pipe ends generating two independent seals.

The cavity between the clamp 226 and the outer surface of the pipe sections also provides a pressure manipulation access in a similar manner to the embodiment shown in FIG. 3 so that in the isolation tool 210 also provides full double block and bleed isolation.

It can be clearly seen that the process could be applied with more traditional tools and the novel isolation tooling could be used as a single stage isolation where the requirement for a two stage process is not required.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method for isolating a small bore pipe, the method comprising the steps of:

providing a clamp surrounding a pipe, the clamp comprising a recess; locating an isolation tool between two sections of the pipe such that the isolation tool spans a bore of the pipe and pipe walls, the isolation tool having a body and a seal element mounted thereon which is arranged to seal the bore of the pipe; and locating a distal end of the body of the isolation tool in the recess,
wherein locating the isolation tool between the two sections of the pipe comprises locating the isolation tool through a hole and a pilot hole provided in opposing walls of the pipe, and
wherein the seal element is configured to be actuated by compression against a base of the pipe upon location of the distal end of the body of the isolation tool in the recess of the clamp through the pilot hole of the pipe.

2. The method of claim 1, wherein the step of locating the isolation tool comprises positioning the isolation tool so that the isolation tool provides at least two contact surfaces with the pipe for resisting and/or transferring fluid pressure forces exerted on the isolation tool from fluid in the pipe.

3. The method of claim 1, comprising the step of forming the holes in the pipe.

4. The method of claim 1, wherein the body of the isolation tool comprises a spigot having a first diameter section and a second diameter section, the second diameter section being of smaller diameter than the first diameter section, and the seal element is compressed against the pipe by axial movement of the spigot.

5. The method of claim 1, comprising the step of providing a branch connection in the clamp to provide access to the pipe.

6. The method of claim 1, comprising the step of driving the isolation tool into the pipe.

7. The method of claim 1, comprising the step of withdrawing the isolation tool from the pipe.

8. The method as recited in claim 1 wherein a diameter of the pilot hole is less than a diameter of the seal element.

9. An isolation tool for isolating small bore pipe, the isolation tool comprising:
a body;
a seal element for mounting on the body;
the isolation tool configured so that when the body spans a bore of the pipe and walls of the pipe through a hole and a pilot hole provided in opposing walls of the pipe, the seal element seals the bore of the pipe; and
a clamp comprising a recess,
wherein a distal end of the isolation tool body is configured to be located in the recess of the clamp, and
wherein the seal element is configured to be actuated by compression against a base of the pipe upon location of the distal end of the isolation tool body in the recess of the clamp through the pilot hole of the pipe.

10. The isolation tool of claim 9, wherein the isolation tool is configured for location in the pipe so that the isolation tool provides at least two contact surfaces with the pipe for resisting and/or transferring fluid pressure forces exerted on the isolation tool from fluid in the pipe.

11. The isolation tool of claim 9, wherein the isolation tool comprises a spigot having a first diameter section and a second diameter section, the second diameter section being of smaller diameter than the first diameter section.

12. The isolation tool of claim 9, wherein the seal element comprises at least one of a compliant seal and a bi-directional seal.

13. The isolation tool of claim 9, further comprising an actuator for driving the isolation tool in the pipe.

14. The isolation tool as recited in claim 9 wherein a diameter of the pilot hole is less than a diameter of the seal element.

15. An isolation tool assembly for isolating a small bore pipe, the isolation tool assembly comprising:
a clamp;
a first isolation tool including a first isolation tool body and a first isolation tool seal element for mounting on the first isolation tool body, wherein the first isolation tool is configured so that when the first isolation tool body spans a bore of the pipe and walls of the pipe through a first hole and a first pilot hole provided in opposing walls of the pipe, the first isolation tool seal element seals the bore of the pipe, said first isolation tool seal element being actuatable by compression against the base of the pipe upon location of a distal end of said first isolation tool body in a first recess of said clamp through the first pilot hole of the pipe; and
a second isolation tool spaced from the first isolation tool, wherein the second isolation tool includes a second isolation tool body and a second isolation tool seal element for mounting on the second isolation tool body, wherein the second isolation tool is configured so that when the second isolation tool body spans the bore of the pipe and the walls of the pipe through a second hole and a second pilot hole provided in opposing walls of the pipe, the second isolation tool seal element seals the bore of the pipe, said second isolation tool seal element being actuatable by compression against the base of the pipe upon location of a distal end of said second isolation tool body in a second recess of said clamp through the second pilot hole of the pipe.

16. The isolation tool as recited in claim 15 wherein a diameter of the pilot hole is less than a diameter of the seal element.

17. A method for isolating a small bore pipe, the method comprising the steps of:
providing a clamp surrounding a pipe;
locating a first isolation tool of an isolation tool assembly between two sections of a pipe such that the first isolation tool spans a bore of the pipe and walls of the pipe, wherein locating the first isolation tool between the two sections of the pipe comprises locating the first isolation tool through a first hole and a first pilot hole provided in opposing walls of the pipe;
the first isolation tool has a first isolation tool seal element mounted thereon which is arranged to seal the bore of the pipe by compression against a base of the pipe upon location of a distal end of the first isolation tool body in a first recess of said clamp through the first pilot hole of the pipe; and
locating a second isolation tool of the isolation tool assembly at a spaced location from the first isolation tool, wherein the second isolation tool is located between two sections of the pipe such that the second isolation tool spans the bore of the pipe and the wall of the pipe, wherein locating the second isolation tool between the two sections of the pipe comprises locating the second isolation tool through a hole and a second pilot hole provided in opposing walls of the second pipe, and
the second isolation tool has a second isolation tool seal element mounted thereon which is arranged to seal the bore of the pipe by compression against the base of the pipe upon location of a distal end of the second isolation tool body in a second recess of said clamp through the second pilot hole of the pipe.

18. The method as recited in claim 17 wherein a diameter of the pilot hole is less than a diameter of the seal element.

* * * * *